(12) United States Patent
Aoki et al.

(10) Patent No.: US 11,506,640 B2
(45) Date of Patent: Nov. 22, 2022

(54) PIPING DEVICE FOR ANALYSIS APPARATUS AND ANALYSIS APPARATUS USING THE PIPING DEVICE

(71) Applicant: SHIMADZU CORPORATION, Kyoto (JP)

(72) Inventors: Kengo Aoki, Kyoto (JP); Masahide Gunji, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 294 days.

(21) Appl. No.: 16/485,195

(22) PCT Filed: Jan. 26, 2018

(86) PCT No.: PCT/JP2018/002374
§ 371 (c)(1),
(2) Date: Aug. 12, 2019

(87) PCT Pub. No.: WO2018/150842
PCT Pub. Date: Aug. 23, 2018

(65) Prior Publication Data
US 2019/0369060 A1   Dec. 5, 2019

(30) Foreign Application Priority Data
Feb. 15, 2017 (JP) .............................. JP2017-025619

(51) Int. Cl.
*G01N 30/16* (2006.01)

(52) U.S. Cl.
CPC .................................. *G01N 30/16* (2013.01)

(58) Field of Classification Search
CPC ....................................................... G01N 30/16
(Continued)

(56) References Cited

U.S. PATENT DOCUMENTS

| 3,522,725 A * | 8/1970 | Waters | G01N 30/30 73/61.57 |
| 5,032,283 A * | 7/1991 | Scott | G01N 30/6086 210/656 |

(Continued)

FOREIGN PATENT DOCUMENTS

| JP | 59-168366 A | 9/1984 |
| JP | 2007-268490 A | 10/2007 |

(Continued)

OTHER PUBLICATIONS

Written Opinion of the International Searching Authority of PCT/JP2018/002374 dated Apr. 24, 2018.

(Continued)

*Primary Examiner* — John Fitzgerald
*Assistant Examiner* — Rodney T Frank
(74) *Attorney, Agent, or Firm* — Sughrue Mion, PLLC

(57) ABSTRACT

Obtaining sufficient suppression effect of channel diffusion and stably transferring solution are made possible even in a piping having an extremely small inner diameter used for an analysis apparatus such as an HPLC. A piping device for an analysis apparatus includes a piping equipped with a folded shape that suppresses inner channel diffusion, and a member directly or indirectly in contact with the piping from at least one side to support the piping to suppress deformation of the folded shape.

20 Claims, 7 Drawing Sheets

(58) Field of Classification Search
USPC ........................................................ 73/61.56
See application file for complete search history.

(56) References Cited

U.S. PATENT DOCUMENTS

| | | | |
|---|---|---|---|
| 8,641,267 B2 | 2/2014 | Baeuerle et al. | |
| 9,003,868 B2* | 4/2015 | Ono | G01N 30/34 |
| | | | 73/61.56 |
| 2007/0235100 A1* | 10/2007 | Tomerlin | F16L 11/118 |
| | | | 156/190 |
| 2010/0320132 A1* | 12/2010 | Sakamoto | G01N 30/96 |
| | | | 210/269 |
| 2012/0241378 A1 | 9/2012 | Riviello | |
| 2014/0320146 A1* | 10/2014 | Sakamoto | G01N 30/02 |
| | | | 324/466 |
| 2015/0300998 A1* | 10/2015 | Suslick | G01N 30/48 |
| | | | 422/527 |

FOREIGN PATENT DOCUMENTS

| | | |
|---|---|---|
| JP | 2013-226497 A | 11/2013 |
| JP | 2014-512945 A | 5/2014 |

OTHER PUBLICATIONS

International Search Report of PCT/JP2018/002374 dated Apr. 24, 2018.
Communication dated Jul. 14, 2020, from the Japanese Patent Office in application No. 2018568072.
Notice of Reasons for Refusal dated Dec. 15, 2020 from the Japanese Patent Office in Application No. 2018-568072.

* cited by examiner

PIPING DEVICE FOR ANALYSIS APPARATUS AND ANALYSIS APPARATUS USING THE PIPING DEVICE

CROSS REFERENCE TO RELATED APPLICATIONS

This application is a National Stage of International Application No. PCT/JP2018/002374 filed Jan. 26, 2018, claiming priority based on Japanese Patent Application No. 2017-025619 filed Feb. 15, 2017.

TECHNICAL FIELD

The present invention relates to a piping device used in an analysis apparatus for a liquid chromatograph system or the like, and an analysis apparatus using the piping device.

BACKGROUND ART

Generally, in a high-performance liquid chromatograph (hereinafter, referred to as HPLC), an action works that spreads a sample injected in an analysis flow channel in which a mobile phase flows or a sample component separated by an analysis column in a flow channel direction of a piping (flow direction) by liquid flow field and molecular diffusion. This is called channel diffusion. When channel diffusion occurs, a peak shape of chromatogram disadvantageously becomes a gentle shape, causing lowering of separation performance of the HPLC. Accordingly, how to suppress channel diffusion in the analysis flow channel is important to improve separation performance of the HPLC.

The following theoretical formula exists for channel diffusion in a piping whose cross-sectional shape is a circular shape.

$$c(t) = \frac{\frac{M}{\pi R^2}}{\sqrt{4\pi D_z t}} \exp\left(-\frac{(z - \overline{U}t)^2}{4D_z t}\right)$$

Herein, c(t) denotes density at time t, M denotes initial density, R denotes inner diameter of the piping, Dz denotes apparent mixed diffusion coefficient, U denotes average flow speed, and z denotes length of the piping. According to the theoretical formula, it is typically sufficient that the inner diameter of the piping is reduced, the piping is shortened, or the diffusion coefficient is increased in order to suppress channel diffusion.

A method has been proposed that suppresses channel diffusion in a piping by folding the piping to disturb flow of fluid in the piping as another method (see PTL 1)

PRIOR ART DOCUMENTS

Patent Documents

Patent Document 1: U.S. Pat. No. 5,032,283
Patent Document 2: U.S. Pat. No. 8,641,267

SUMMARY OF THE INVENTION

Problems to be Solved by the Invention

As described above, a method of continuously folding a piping is a very effective method as a method of suppressing channel diffusion in the piping. In order to obtain a sufficient effect of suppressing channel diffusion by the method, it is necessary to make a bend angle R of the folded portion of the piping small to some extent and set the number of folds to be not less than a number of some extent.

In a recent HPLC, in order to shorten analysis time and improve separation performance, a piping having an inner diameter of not more than 0.1 mm, which is extremely thin piping, may be used. In order to obtain sufficient suppression effect of channel diffusion by continuously folding such a piping having an extremely small inner diameter, the fold angle of the piping also needs to be made small to match with the smallness of the inner diameter. Specifically, in a piping that connects a short distance, when the fold angle is large, the number of folds cannot be sufficiently ensured, so that the effect of suppressing channel diffusion cannot be sufficiently obtained.

In order to make the fold angle of the piping small, its outer diameter also needs to be reduced in response to the inner diameter of the piping. However, when the outer diameter of the piping is reduced, strength of the piping itself is also lowered, making it difficult to stably keep its flow channel shape.

As described above, in order to suppress channel diffusion, increasing the diffusion coefficient is effective. The diffusion coefficient can be calculated by the following formula.

$$D = \frac{kT}{6\pi\mu a}$$

Herein, k denotes Boltzmann constant, T denotes temperature, $\mu$ denotes viscosity, and a denotes particle radius. This formula shows that increasing the temperature T is effective to increase the diffusion coefficient (because the viscosity $\mu$ lowers when the temperature T increases). However, in the piping structure disclosed in PTL: 1, an air layer exists between an inner piping continuously folded and an outer piping housing the inner piping, making heat around the outer piping be less likely to be transferred to the inner piping. Accordingly, thermal transfer efficiency is bad in a case where the temperature of the inner piping is to be heated, disadvantageously making quick heating be less likely be performed.

A technique has also been proposed that forms a flow channel having a continuous folded shape or the like in a substrate using MEMS technique (see PTL: 2). However, such a structure is formed by laminating substrates, so that there is a problem in that the structure cannot be used when high pressure resistance is required such as in the HPLC, or manufacturing cost becomes high.

Therefore, the present invention aims to obtain sufficient suppression effect of channel diffusion also to a piping having an extremely small inner diameter that has been used recently in addition to a piping that has been conventionally used in an analysis apparatus for HPLC or the like, and make stable solution transfer possible.

Solutions to the Problems

A piping device for an analysis apparatus according to the present invention includes a pining provided with a folded shape substantively folded to suppress inner channel diffusion, and a member directly or indirectly in contact with the piping from at least one side of the piping to support the piping to suppress deformation of the folded shape.

Herein, the folded shape of the piping may be substantially formed in a plane, or may be three-dimensionally formed. Forming the folded shape in a plane allows stable supporting of the folded shape by the member. Note that that "the folded shape is substantially formed in a plane" not only includes the fact that the folded shape is perfectly formed in the same plane, but also includes that a portion of the folded shape does not perfectly falls in the same plane due to twist or warp.

The member may be directly or indirectly in contact with the piping also from a side opposite to the one side of the piping. This makes the piping be supported to be sandwiched by the member, which makes the folded shape be less likely to be disturbed moreover, improving stability of solution transfer.

It is preferable that the member holds a portion of the piping where the folded shape is provided to keep the folded shape. That the member holds the portion where the folded shape is provided to keep the folded shape denotes that the member and the piping are joined not to disturb the folded shape of the piping. The member and the piping may be joined by adhesive, or may be performed by another method such as welding. This enables to more surely keep the folded shape of the piping and improve stability of solution transfer.

The member may be a rod-shaped member. In this case, the piping can obtain an effect of suppressing inner channel diffusion by being equipped with the folded shape by being wound around the rod-shaped member to be substantively folded.

The member may be a pipe-shaped member housing therein the piping.

Examples of the pipe-shaped member include a thermally shrinkable tube. Using the thermally shrinkable tube enables to readily keep the folded shape of the piping.

It is preferable that the member is made of a thermal conductive material, and is thermally in contact with the piping. When the member is made of a thermal conductive material, heat around the piping is transferred to the piping through the member, which improves thermal transfer efficiency to the piping, making it possible to readily control the temperature of the piping.

A heater may be further provided that is thermally in contact with the piping to heat the piping. Uniquely being equipped with the heater enables to uniquely heat fluid in the piping.

When the piping device is uniquely equipped with the heater, it is preferable that the piping device further includes a temperature sensor for measuring a temperature of the piping, and a temperature control part for controlling an output of the heater to make the temperature of the piping becomes a predetermined temperature based on a signal from the temperature sensor. This enables to uniquely adjust the temperature of the piping to keep liquid temperature inside the piping constant even when disturbance such as room temperature fluctuation occurs. This stabilizes fluid temperature flowing in the analysis flow channel by providing at least a portion of the analysis flow channel of the analysis apparatus with the piping device, improving reproducibility of analysis.

As described above, increasing fluid temperature in the piping is effective as a method of suppressing channel diffusion in the piping. In an LC system, a piping housed in a column oven is kept at a constant temperature by the column oven, but a piping disposed outside the column oven, for example, a piping that connects between the column oven and a detector or a piping that connects a second detector such as a mass spectrometer on a further downstream side of the detector is not controlled in temperature, readily causing channel diffusion in the piping. Therefore, using the above-mentioned piping device uniquely equipped with a heater as a piping provided outside the column oven enables heating by a heater different from the column oven, making it possible to suppress channel diffusion in the piping.

The piping device uniquely equipped with a heater can also be used as a piping in an immediately previous stage of the analysis column. This enables to heat sample solution just before flowing in the analysis column, which suppresses temperature distribution of the sample solution in the analysis column, making it possible to improve separation performance.

In a preferable aspect of the piping device uniquely equipped with a heater, the member has a flat face on a side opposite to a face in contact with the piping, and the heater is a sheet-like heater in contact with the flat face of the member. Such a configuration readily heats the piping evenly by the sheet-like heater.

The piping has an outer diameter of, for example, not more than 0.5 mm. In the piping structure disclosed in PTL: 1, a continuously folded piping is fixed at an end in a state where the piping is housed inside a piping having a large inner diameter. When the piping housed inside has an outer diameter of not more than 0.5 mm, which is extremely thin, the inner piping is shaken to be slightly deformed in its shape or collides against a wall of the outer piping to affect flowing of fluid flowing in the inner piping when the outer piping is only moved due to some cause, which may disadvantageously make solution transfer unstable. Accordingly, when a piping having an inner diameter of not more than 0.1 mm is used such as in a recent HPLC, in the piping structure disclosed in PTL: 1, tolerance to external force is low, so that such a piping structure cannot be applied as it is. In contrast, in the present invention, the piping is supported to suppress deformation of the folded shape by the member, which readily keeps the folded shape of the piping even when an extremely thin piping having an outer diameter of not more than 0.5 mm is used, making it possible to stable solution transfer.

Note that in the present invention, the outer diameter of the piping is not limited to not more than 0.5 mm, and a piping having a larger outer diameter can be also applied to the present invention.

The member may be a reinforcement piping joined to a plurality of portions of the piping where the folded shape of the piping is formed. That is, the member in the present invention can be provided by, for example, another piping (reinforcement piping) used in the same analysis apparatus.

In the above-mentioned preferable aspect, the reinforcement piping is also provided with a continuous folded shape, and the reinforcement piping and the piping are joined to support their folded shapes with each other.

An analysis apparatus according to the present invention includes at least an analysis flow channel, a sample injection unit that injects a sample in the analysis flow channel, a separation unit provided on a downstream side of the sample injection unit on the analysis flow channel, the separation unit being configured to separate the sample injected by the sample injection unit into each component, and a detector provided on a downstream side of the separation unit on the analysis flow channel, the detector being configured to detect a sample component separated by the separation unit.

At least a portion of a flow channel on the downstream side of the sample injection unit among a flow channel forming the analysis flow channel is formed of the above-mentioned piping device.

An example of the analysis apparatus according to the present invention is an HPLC. In this case, it is preferable that the separation unit is formed of a separation column and a column oven that houses therein the separation column and adjusts a temperature of the separation column to be a predetermined temperature, and a flow channel disposed outside the column oven among the flow channel on the downstream side of the sample injection unit is formed of a piping device uniquely equipped with a heater. This enables to uniquely heat the piping outside the column oven, making it possible to suppress channel diffusion in the piping outside the column oven.

A plurality of detectors may be provided in the HPLC, and in this case, it is preferable that the piping device uniquely equipped with a heater is connected on an entrance side of the detectors. This enables to suppress channel diffusion in the piping leading to each detector.

Effects of the Invention

The piping device according to the present invention includes a piping provided with a folded shape and a member directly or indirectly in contact with the piping from at least one side of the piping to support the piping to suppress deformation of the folded shape, which makes the folded shape of the piping be less likely deformed due to external force, making it possible to obtain channel diffusion suppression effect while keeping stability of flow of fluid flowing in the piping. This enables to keep the folded shape to suppress channel diffusion even in a case where an extremely thin piping, for example, having an outer diameter of not more than 0.5 mm is used besides using a typical piping that has been used in a conventional analysis apparatus, which makes the piping to have a sufficient folded number even when the piping device is used for connecting a short distance, making it possible to obtain sufficient suppression effect of channel diffusion.

In the analysis apparatus according to the present invention, at least a portion of a flow channel on a downstream side of a sample injection unit among an analysis flow channel is formed by the above-mentioned piping device, making it possible to suppress diffusion of a sample injected in the analysis flow channel by the sample injection unit due to an effect of the folded shape of the piping while keeping stability of flow amount of fluid flowing in the analysis flow channel.

EMBODIMENT OF THE INVENTION

Hereinafter, an embodiment of a piping device for analysis apparatus and an analysis apparatus formed by using the piping device according to the present invention will be described.

Figure 1:
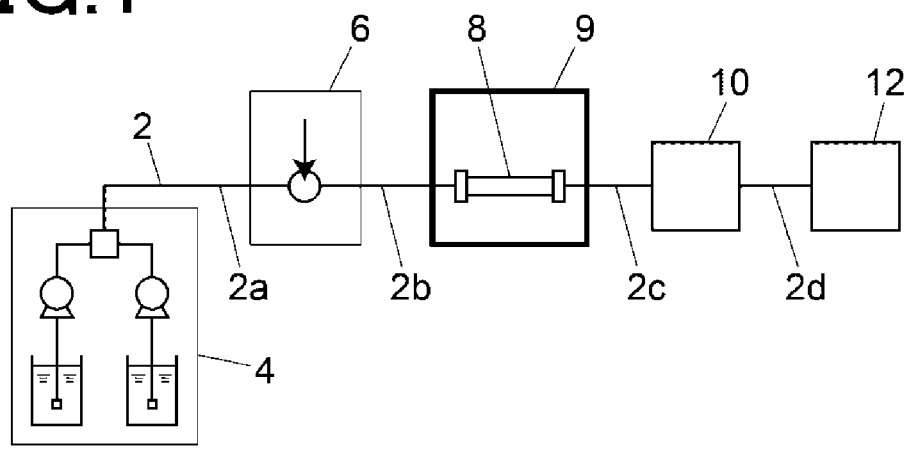
FIG. 1 is a schematic configuration diagram illustrating an example of an HPLC system.

First, a configuration of an HPLC system that is an embodiment of the analysis apparatus of the present invention will be described with reference FIG. 1.

The HPLC system of the embodiment includes an analysis flow channel 2, a solution transfer device 4, a sample injection unit 6, an analysis column 8, a column oven 9, a detector 10, and a mass spectrometer 12. The analysis flow channel 2 is formed of pipings 2a, 2b, 2c, and 2d.

The solution transfer device 4 is configured to draw a mobile phase from a vessel storing the mobile phase by a pump and transfer the mobile phase. The sample injection unit 6 is connected to downstream of the solution transfer device 4 via the piping 2a, and the analysis column 8 is connected to further downstream of the sample injection unit 6 via the piping 2b. The analysis column 8 is housed in the column oven 9. The detector 10 is connected to further downstream of the analysis column 8 via the piping 2c, and the mass spectrometer 12 (hereinafter, referred to as MS 12) is connected to further downstream of the detector 10 via the piping 2d.

The sample injection unit 6 is configured to automatically collect a sample to inject it in the analysis flow channel 2. The sample injected by the sample injection unit 6 is introduced to the analysis column 8 by the mobile phase from the solution transfer device 4, and separated for each component in the analysis column 8. An inner space of the column oven 9 housing therein the analysis column 8 is adjusted to be a constant temperature. The sample component separated in the analysis column 8 is sequentially introduced to the detector 10 and MS 12 to be detected.

In the HPLC system, peak shape of chromatogram obtained by the detector 10 and the MS 12 can be improved by suppressing channel diffusion inside the piping 2b connecting between the sample injection unit 6 and the analysis column 8, the piping 2c connecting between the analysis column 8 and detector 10, and the piping 2d connecting between the detector 10 and the MS 12, making it possible to enhance separation performance. Therefore, in the LC system of the example, a portion or all of at least one piping among the pipings 2d, 2c, and 2d forming portions of the analysis flow channel 2 is formed by a piping device having a channel diffusion suppression function described below.

Note that the above-mentioned configuration of the HPLC is only an example of the analysis apparatus according to the present invention. The present invention can be applied to every analysis apparatus equipped with the sample injection unit that injects a sample into the analysis flow channel, the separation unit that separates the sample injected by the sample injection unit for each component, and at least one detector that detects the component separated by the separation unit. Accordingly, for example, the MS12 of the HPLC in FIG. 1 need not necessarily be provided, and a preparative LC may be employed in which a fraction collector that performs fraction trapping of sample components on the basis of a detection signal of the detector 10 is provided instead of the MS12.

FIG. 2 to FIG. 9 each illustrate an example of the piping device for analysis apparatus such as the HTPL described above.

Piping devices 1a to 1h of respective examples of FIG. 2 to FIG. 9 described below include a piping 16. The piping 16 includes a diffusion suppression part 18 having a continuously folded shape in which mountains and valleys are alternately continuous. The continuously folded shape of the diffusion suppression part 18 is designed in such a way that an effect of suppressing channel diffusion of fluid flowing in the piping 16 can be sufficiently obtained. In the drawings, although the folded shape of the diffusion suppression part 18 is substantially formed in a plane, the folded shape need not necessarily be substantially formed in a plane, and may be three-dimensionally formed. For example, the piping 16 may exert a substantially equivalent diffusion suppression effect to that of the folded piping by being wound around a rod-shaped member. Note that the folded shape of the diffusion suppression part 18 need not necessarily be continuously provided, and a plurality of folded shapes may be intermittently provided.

The material of the piping 16 is the same material as that of a typical piping such as stainless steel. The outer diameter and the inner diameter of the piping 16 are not specifically limited, and the piping 16 may be an extremely thin piping having an inner diameter of not more than 0.1 mm and an outer diameter of not more than 0.5 mm. Such an extremely thin piping 16 has a low strength, so that the folded shape of the diffusion suppression part 18 is readily deformed disadvantageously only when a small external force such as shaking of the device, contact of a hand of a user or the like to the piping 16, or wind pressure to the piping 16 acts thereon, disadvantageously disturbing flow of fluid flowing in the piping 16. Accordingly, each of the piping devices 1a to 1h of the following examples includes a member for keeping the folded shape of the diffusion suppression part 18.

Figure 2:
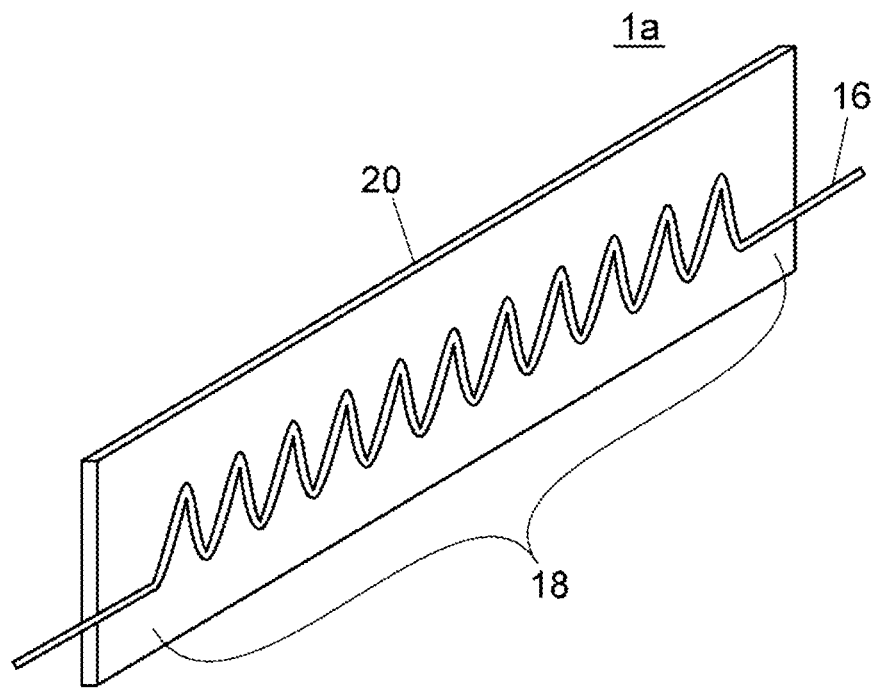
FIG. 2 is a perspective view illustrating an example of a piping device for the HPLC system.

In the piping device 1a illustrated in FIG. 2, the member for keeping the folded shape of the diffusion suppression part 18 is provided by one reinforcement sheet 20. The reinforcement sheet 20 may be a plate-shape or a seal shape. The reinforcement sheet 20 and the diffusion suppression part 18 of the piping 16 are wholly or partially fixed by adhesive, welding, brazing, or the like. The reinforcement sheet 20 firstly aims to keep the folded shape of the diffusion suppression part 18, so that any size and any material may be employed as long as it adds some degree of strength to the diffusion suppression part 18.

However, when the piping device 1a is used for forming the flow channel in the column oven 9 (see FIG. 1), the reinforcement sheet 20 is preferably made of a thermal conductive material such as aluminum. This makes surrounding heat be readily transferred to the piping 16 via the reinforcement sheet 20, improving thermal transfer efficiency to the piping 16 to readily control temperature of the fluid flowing in the piping 16.

Figure 3:
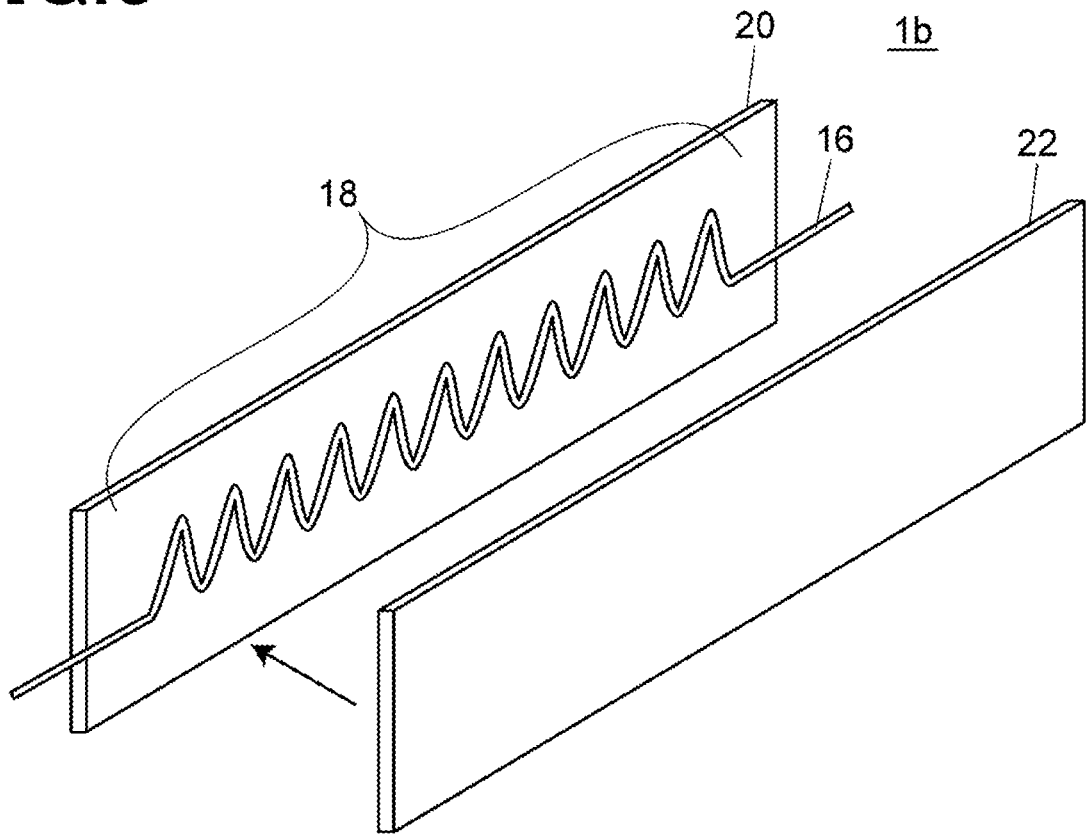
FIG. 3 is an exploded perspective view illustrating another example of the piping device.

In the wiring device 1b illustrated in FIG. 3, the member for supporting the diffusion suppression part 18 of the piping 16 is formed by the reinforcement sheet 20 in the example of FIG. 2 as well as a reinforcement sheet 22. In this case, the reinforcement sheets 20 and 22 may not be fixed to the diffusion suppression part 18 of the piping 16, and may be formed to sandwich the diffusion suppression part 18 between them to only hold the diffusion suppression part 18. Alternatively, one or both of the reinforcement sheets 20, 22 may be fixed to the diffusion suppression part 18 by adhesive, welding, brazing, or the like.

Both the reinforcement sheets 20, 22 may be made of a thermal conductive material such as aluminum, or any one thereof may be made of a thermal conductive material. A thermal conductive adhesive or the like may be filled in a space between the reinforcement sheets 20, 22.

Figure 4:
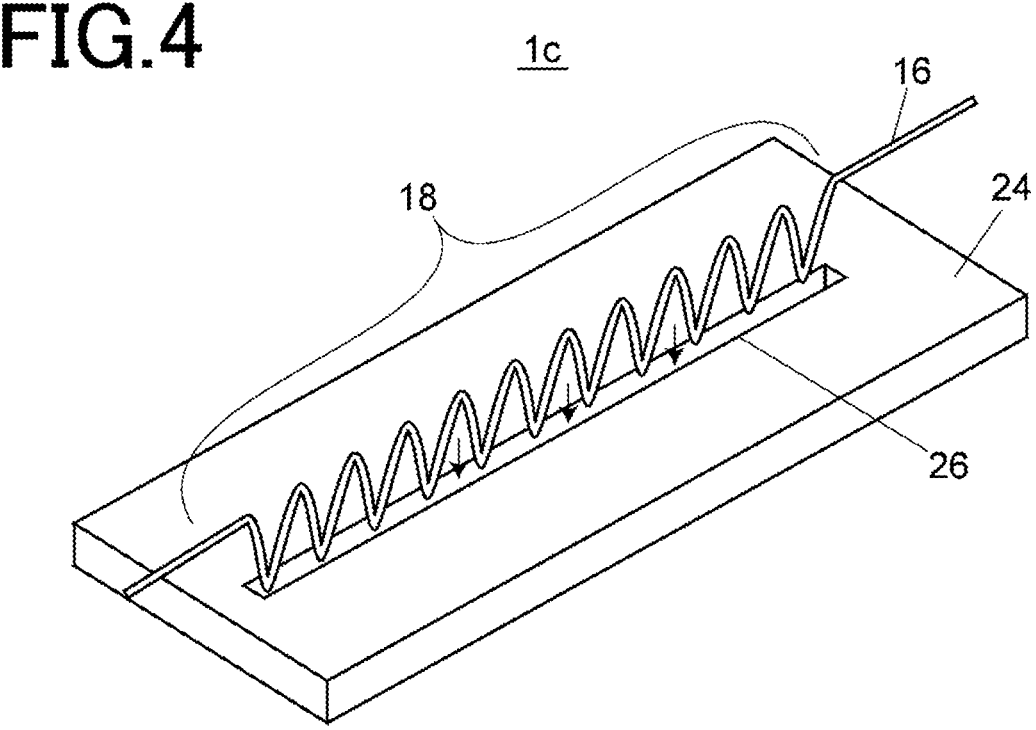
FIG. 4 is an exploded perspective view illustrating still another example of the piping device.

In the piping device 1c illustrated in FIG. 4, the member for supporting the diffusion suppression part 18 of the piping 16 is provided by a plate 24 provided with a slit 26 on its main flat face. The piping 16 and the plate 24 are fixed to each other in a state where the diffusion suppression part 18 of the piping 16 is fitted in the slit 26 of the plate 24.

Fixing method between the piping 16 and the plate 24 is not specifically limited. For example, only straight parts of both sides of the diffusion suppression part 18 of the piping 16 may be fixed to the plate 24 by adhesive, welding, brazing, or the like. Such a fixing method also protects the diffusion suppression part 18 of the piping 16 by being fitted in the slit 26. Alternatively, the diffusion suppression part 18 itself may be fixed to the plate 24 in the slit 26 by adhesive, welding, brazing, or the like to perfectly fix the folded shape of the diffusion suppression part 18. Further, another adhesive sheet or the like may be used to fix the piping 16 to the plate 24.

The shape of the slit 26 may be any shape as long as the diffusion suppression part 18 of the piping 16 is fitted therein, and the slit 26 may be processed to have a shape according to the shape of the diffusion suppression part 18. The slit 26 having such a shape can be formed by, for example, electric spark machining.

The plate 24 has a thickness (e.g., 0.5 mm) and a stiffness to some extent. Although the material of the plate 24 is not specifically limited, the plate 24 can improve thermal transfer efficiency to the piping 16 when it is made of a thermal conductive material such as, for example, aluminum.

Figure 5:
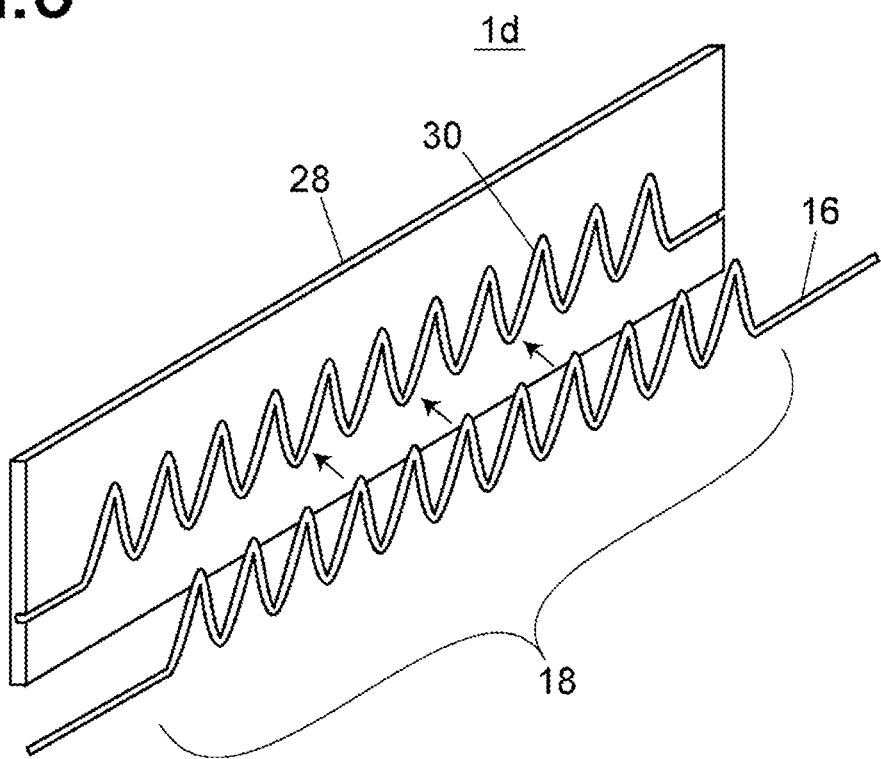
FIG. 5 is an exploded perspective view illustrating still another example of the piping device.

In the piping device 1d illustrated in FIG. 5, the member is provided by a plate 28 on which a groove 30 corresponding to the shape of the diffusion suppression part 18 of the piping 16 is formed. The folded shape of the diffusion suppression part 18 is kept by fitting the diffusion suppression part 18 of the piping 16 in the groove 30 of the plate 28.

The diffusion suppression part 18 of the piping 16 may be fixed to the plate 28 by adhesive, welding, brazing, or the like. Alternatively, by using another plate different from the plate 28, the diffusion suppression part of the piping 16 may be sandwiched between the two plates to hold it. The other plate different from the plate 28 may be a mere flat plate, or a plate on which a groove similar to the groove 30 of the plate 28 is provided. Alternatively, the diffusion suppression part 18 may be fixed in a state of being fitted in the groove 30 by attaching an adhesive sheet on the piping 16 and the plate 28 in a state where the diffusion suppression part 18 of the piping 16 is fitted in the groove 30 of the plate 28.

Also in the example, the material of the plate 28 forming the member is not specifically limited. However, using a thermal conductive material such as aluminum makes it possible to improve thermal transfer efficiency to the piping 16.

Figure 6:
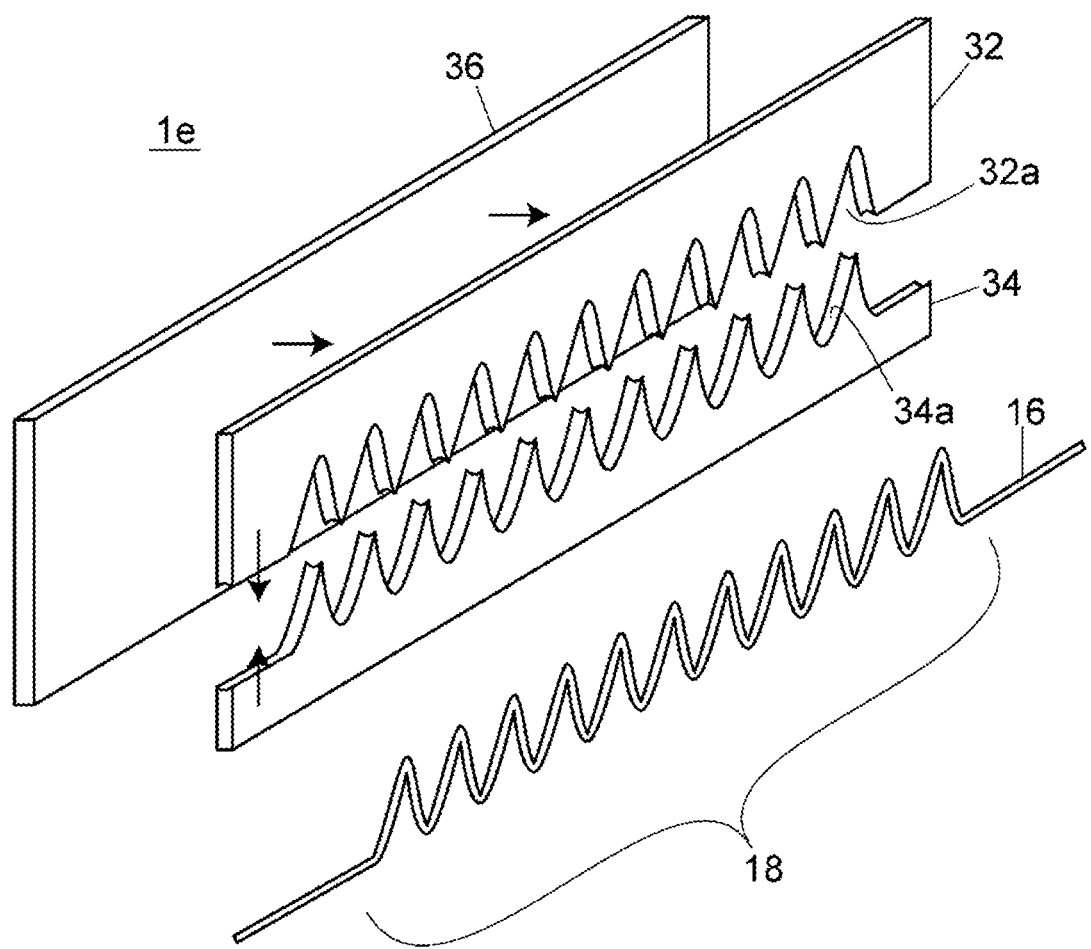
FIG. 6 is an exploded perspective view illustrating still another example of the piping device.

The piping device 1e illustrated in FIG. 6 is configured to keep the folded shape of the diffusion suppression part 18 of the piping 16 by sandwiching the diffusion suppression part 18 of the piping 16 between wave shaped end faces 32a, 34a of the respective two plates 32 and 34 having a wave shape corresponding to the folded shape of the diffusion suppression part 18 of the piping 16. The plates 32 and 34 sandwiching the diffusion suppression part 18 between their end faces 32a, 34a are fixed by attaching a fixing sheet 36 to the plates 32 and 34. The fixing sheet 36 may have a plate having a thickness to some extent, or may be an adhesive seal or the like. The fixing method of the plates 32 and 34 sandwiching the diffusion suppression part 18 between their end faces 32a, 34a is not limited to this, and they may be fixed by any method.

Also in the example, the material of the plates 32, 34 and the sheet 36 is not specifically limited. However, using a thermal conductive material as the material enables to improve thermal transfer efficiency to the piping 16.

In the piping devices 1a to 1e that are the examples of FIG. 2 to FIG. 6 described above, a sheet-like member is used as the member that suppresses deformation of the folded shape of the piping 16, and at least one side face of the member that suppresses deformation of the folded shape of the piping 16 is a flat face. A sheet-like heater can be attached on the flat face, making it possible to make the piping devices 1a to 1e themselves have a function of heating the piping 16.

Figure 7:
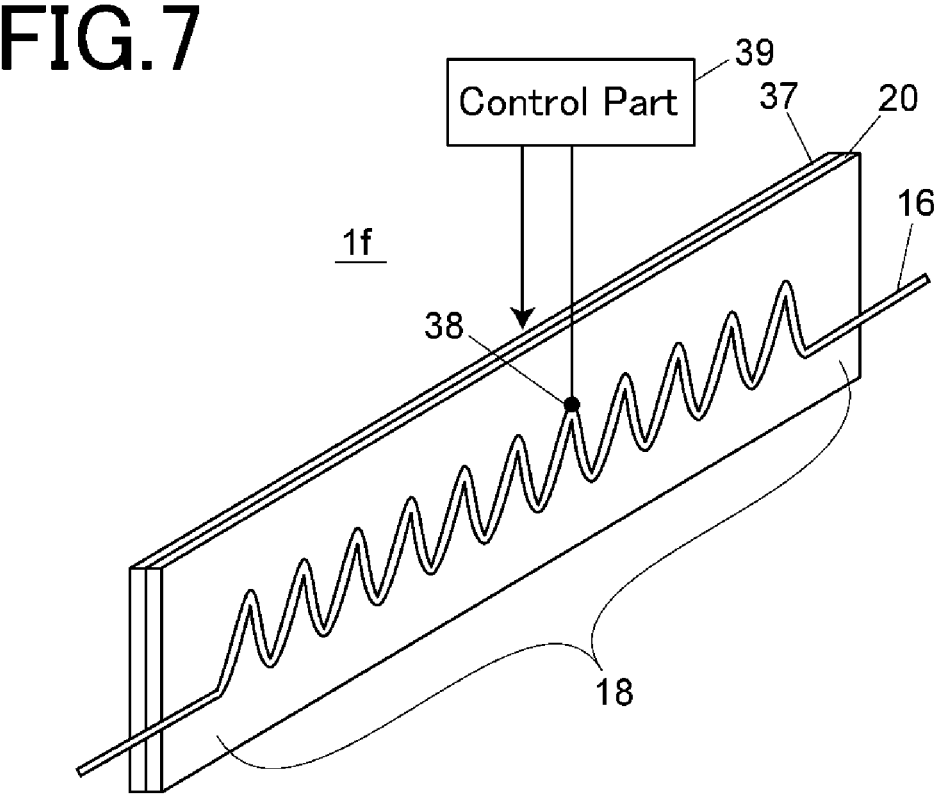
FIG. 7 is a perspective view illustrating an example of a piping device uniquely equipped with a heater.

In the piping device 1f illustrated in FIG. 7, a sheet-shaped heater 37 such as a rubber heater is attached on a flat face on a side opposite to the flat face in contact with the piping 16 among the flat faces of the reinforcement sheet 20 of the wiring device 1a in FIG. 2. The same structure can also be applied to the piping devices 1b to 1e of the examples of FIG. 3 to FIG. 6. The heater may have a shape other than the sheet-like shape, and be thermally in contact with the piping 16 without interposing the member that suppresses deformation of the folded shape.

When a heater is uniquely equipped in the piping device, as illustrated in FIG. 7, it is preferable that a temperature sensor 38 for measuring temperature of the piping 16 and a control part 39 for controlling output of the heater 37 on the basis of a signal from the temperature sensor 38 are also equipped. This makes it possible to uniquely control the temperature of the piping 16 for stabilization.

The above-mentioned piping device 1f uniquely equipped with the heater can be used as, for example, the flow channels 2c and 2d (see FIG. 1) provided outside the column oven 9 in the HPLC system. The piping provided outside the column oven 9 is exposed to the outside air, which lowers the temperature of fluid flowing in the piping, readily causing channel diffusion. Forming the flow channels 2c and 2d by the piping device 1f uniquely equipped with the heater 37 enables to keep the temperature of fluid flowing in the flow channels 2c and 2d constant, making it possible to suppress channel diffusion in the flow channels.

The above-mentioned piping device 1f uniquely equipped with the heater 37 can also be used as the piping 2b in an immediately previous stage of the analysis column (see FIG. 1) in the column oven 9. This enables to heat sample solution just before flowing in the analysis column 8, which suppresses temperature distribution of the sample solution in the analysis column 8, making it possible to improve separation performance.

In the examples of FIG. 2 to FIG. 7, a sheet-like member is used as the member that suppresses deformation of the folded shape of the piping 16. However, the piping device according to the present invention is not limited to this. For example, in a piping device 1g illustrated in FIG. 8, the member that suppresses deformation of the folded shape of the piping 16 can be formed by a member 40 having a wire shape or a tubular shape. The member 40 and the diffusion suppression part 18 of the piping 16 are fixed by adhesive, welding, brazing, or the like.

A thin sheet-like heater may be attached to the member 40 to make such piping device 1g uniquely have a function of heating the piping 16, or a heating wire may be wound around the piping 16 and the member 40 in a coil manner.

Although omitted in the drawing, in a case where the piping device is formed by winding the piping 16 around a rod-shaped member to exert diffusion suppression effect equivalent to the case where the piping 16 is folded, a unique piping heating function can be provided also to the piping device by further winding a heating wire around the rod-shaped member around which the piping 16 is wound.

Figure 8:
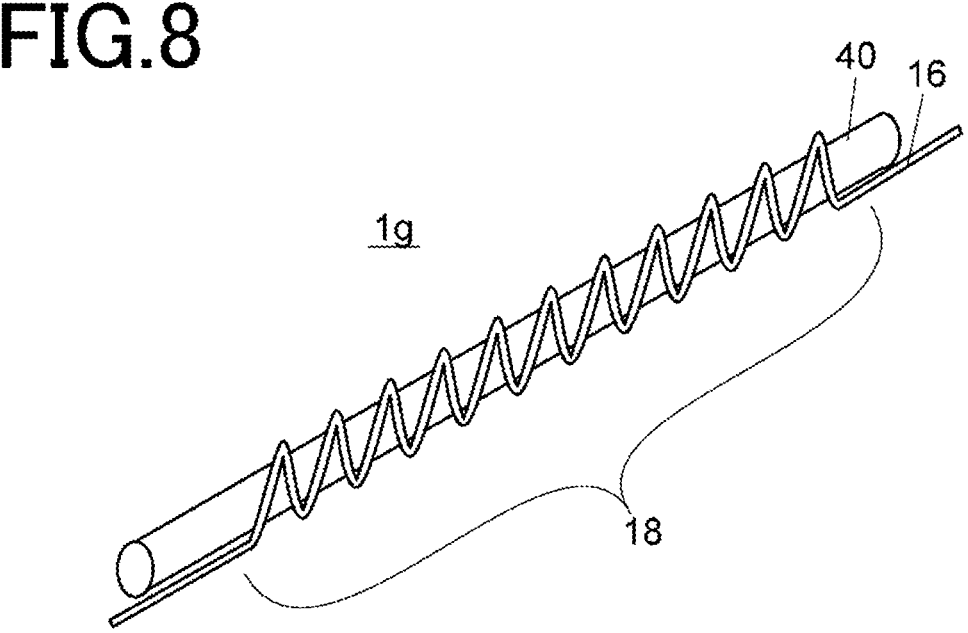
FIG. 8 is an exploded perspective view illustrating still another example of the piping device.
Figure 10:
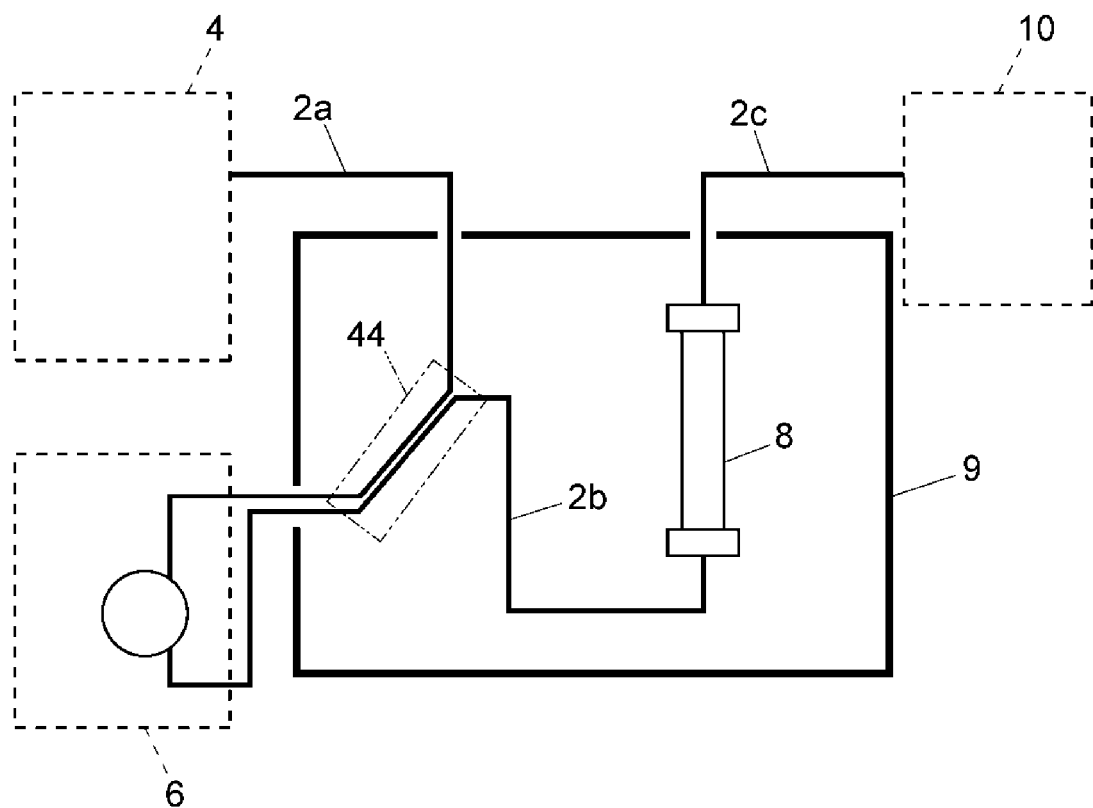
FIG. 10 is a flow channel configuration diagram schematically illustrating an example of a configuration of an LC system equipped with a piping device utilizing another piping.

The member 40 having a tubular shape can also be provided by, for example, another piping used in the same HPLC system. Examples of a piping configuration for providing the member 40 by the other piping include a configuration illustrated in FIG. 10. In the example of FIG. 10, a portion of the piping 2a connecting between the solution transfer device 4 and the sample injection unit 6 is withdrawn in the column oven 9, and the withdrawn portion of the piping 2a and a portion of the piping 2b connecting between the sample injection unit 6 and the analysis column 8 are made close to each other. A proximity portion 44 of the piping 2a and the piping 2b is formed by the piping device 1g as illustrated in FIG. 8. In this case, the member 40 in FIG. 8 forms a part of the piping 2a, and the piping 16 in FIG. 8 forms a part of the piping 2b.

Figure 9:
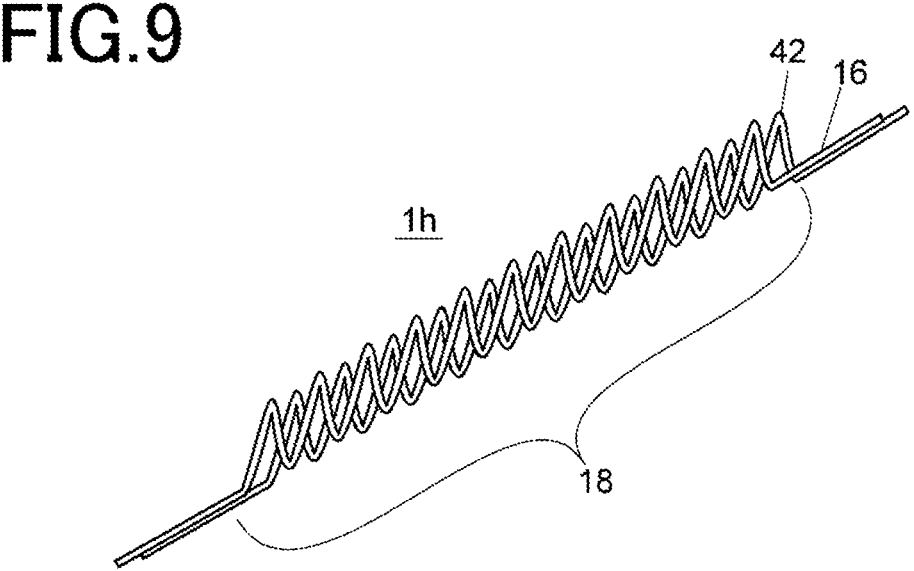
FIG. 9 is an exploded perspective view illustrating still another example of the piping device.

Furthermore, as illustrated in FIG. 9, the member itself may be a piping 42 (reinforcement piping) having a diffusion suppression part having a continuous folded shape such as the piping 16. In this case, the diffusion suppression part 18 of the piping 16 and the diffusion suppression part of the reinforcement piping 42 are joined by adhesive, welding, brazing, or the like to support their folded shape parts with each other. Such a configuration can also be provided by the piping configuration of the HPLC system as illustrated in FIG. 10. In this case, the reinforcement piping 42 and the piping 16 of the piping device 1h in FIG. 10 respectively form a part of the piping 2b and a part of the piping 2c.

As described above, in the piping devices 1a to 1h forming at least some or all of the flow channels 2b, 2c, and 2d of the HPLC system, the piping 16 includes the diffusion suppression part 18 having an effect of suppressing channel diffusion, and is supported by the member to keep the folded shape of the diffusion suppression part 18, making it possible to ensure stability of solution transfer while obtaining a sufficient diffusion suppression effect even when the piping 16 is an extremely thin piping having an inner diameter of not more than 0.1 mm.

Note that the examples illustrated in FIG. 2 to FIG. 9 are only examples according to the embodiment of the piping device of the present invention, and the present invention includes other modes. For example, a mode can be conceived in which at least the diffusion suppression part of the piping 16 is hardened by a rubber or a resin (e.g., woodworking bond, glue gun, or the like). In this case, the rubber or the resin hardening the folded shape of the piping 16 plays a role as a member for suppressing deformation of the folded shape. Further, a mode can be conceived in which the piping and the member are covered with a thermally shrinkable tube together, and the piping and the member are fixed by heat shrinking the thermally shrinkable tube. Covering only the piping with the thermally shrinkable tube for fixation disadvantageously corrects the folded shape of the piping to have a liner shape by the thermally shrinkable tube. However, such a correction is prevented by covering a member having a constant strength, for example, a metal plate with the thermally shrinkable tube together with the piping, making it possible to stably fix the piping and the member.

Figure 11:
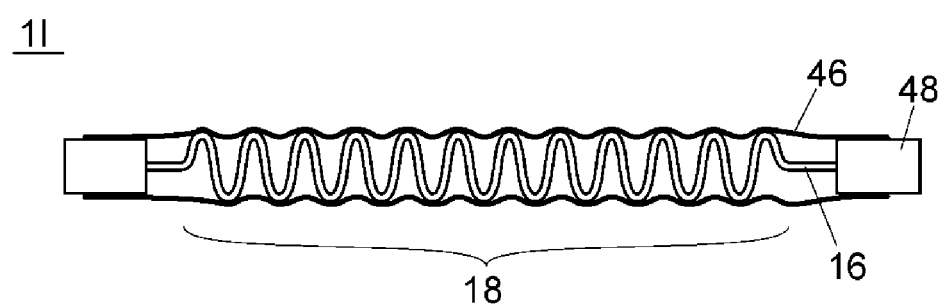
FIG. 11 is a cross sectional view illustrating still another example of the piping device.

Further, as illustrated in FIG. 11, a mode can be conceived in which the piping 16 is housed inside a pipe-shaped member 46 and the piping 16 is fixed at both ends of the pipe-shaped member. Making an inner diameter of the pipe-shaped member smaller than an amplitude of the diffusion suppression part 18 to an extent not to lose diffusion suppression effect by the diffusion suppression part 18 to make portions of the piping 16 be in contact with an inner wall of the pipe-shaped member makes the position and the shape of each portion of the piping 16 be readily kept, making it possible to obtain diffusion suppression effect while suppressing deformation of the piping 16 due to external force. The pipe-shaped member may be a thermally shrinkable tube or the like made of a resin, or may be made of a metal.

The piping device 1 illustrated in FIG. 11 uses a thermally shrinkable tube as the pipe-shaped member 46. The diffusion suppression part 18 of the piping 16 is housed in the thermally shrinkable tube 46, and the thermally shrinkable tube 46 is made to be thermally shrunk. Both ends of the piping 16 are held by sleeves 48, and the sleeves 48 are held by the thermally shrinkable tube 46 thermally shrunk, which also fixes positions of the ends of the piping 16.

DESCRIPTION OF REFERENCE SIGNS 1a to 1h: Piping device
2: Analysis flow channel
2a, 2b, 2c, 2d: Flow channel (piping)
4: Solution transfer device
6: Sample injection unit
8: Analysis column
9: Column oven
10: Detector
12: MS (second detector)
16: Piping
18: Diffusion suppression part
20, 22: Reinforcement sheet (member)
24, 28, 32, 34: Plate
26: Slit
30: Groove
36: Fixing sheet
37: Sheet-shaped heater
38: Temperature sensor
39: Control part
40: Member having wire shape or tubular shape
42: Reinforcement piping
44: Proximity portion of piping
46: Pipe-shaped member (thermally shrinkable tube)
48: Sleeve

The invention claimed is:

1. A piping device for an analysis apparatus comprising:
a piping including a diffusion suppression part which has a continuously folded shape, wherein the piping has an inner diameter and an outer diameter, the diffusion suppression part has a plurality of folded parts so as to suppress inner channel diffusion, and the diffusion suppression part has a length; and
a member that is provided along the diffusion suppression part and is directly in contact with the whole of the length of the diffusion suppression part to support the diffusion suppression part to suppress deformation of the folded shape.

2. The piping device according to claim 1, wherein the folded shape of the diffusion suppression part is substantially provided in a plane.

3. The piping device according to claim 1, wherein the member holds the diffusion suppression part of the piping to keep the folded shape.

4. The piping device according to claim 1, wherein the member is a pipe-shaped member housing therein the piping, and
the pipe-shaped member has an inner diameter smaller than an amplitude of the diffusion suppression part.

5. The piping device according to claim 4, wherein the pipe-shaped member is a thermally shrinkable tube.

6. The piping device according to claim 1, wherein the member is made of a thermal conductive material, and is thermally in contact with the piping.

7. The piping device according to claim 1 further comprising a heater that is thermally in contact with the piping to heat the piping.

8. The piping device according to claim 7 further comprising:
a temperature sensor for measuring a temperature of the piping; and
a temperature control part for controlling an output of the heater to make the temperature of the piping become a predetermined temperature based on a signal from the temperature sensor.

9. The piping device according to claim 7, wherein the member has a flat face on a side opposite to a face in contact with the piping, and the heater is a sheet-like heater in contact with the flat face of the member.

10. The piping device according to claim 1, wherein the outer diameter of the piping is not more than 0.5 mm.

11. The piping device according to claim 1, wherein the member is a reinforcement piping joined to a plurality of portions of diffusion suppression part of the piping.

12. The piping device according to claim 11, wherein the reinforcement piping is also provided with a continuous folded shape, and the reinforcement piping and the piping are joined to support their folded shapes with each other.

13. The piping device according to claim 1, wherein the member includes a reinforcement sheet which has a plate-shape or a seal shape, or a cylindrical wire shape or a cylindrical tubular shape, or a piping device which has a diffusion suppression part having a continuous folded shape.

14. The piping device according to claim 13, wherein the member is formed by two reinforcement sheets which have a plate-shape or a seal shape,
the two reinforcement sheets are formed to sandwich the diffusion suppression.

15. The piping device according to claim 13, wherein the member is formed by a reinforcement sheet, the reinforcement sheet has a slit on its main flat face, and
the diffusion suppression part is fitted in the slit.

16. The piping device according to claim 13, wherein the member is formed by a reinforcement sheet, the reinforcement sheet has a groove corresponding to the shape of the diffusion suppression part, and the diffusion suppression part is kept by the groove.

17. The piping device according to claim 13, wherein the member is formed by a reinforcement sheet, the reinforcement sheet has two wave shaped end faces, and the two wave shaped end faces are formed to sandwich the diffusion suppression.

18. An analysis apparatus comprising at least:
an analysis flow channel;
a sample injection unit that injects a sample in the analysis flow channel;
a separation unit provided on a downstream side of the sample injection unit on the analysis flow channel, the separation unit being configured to separate the sample injected by the sample injection unit; and
a detector provided on a downstream side of the separation unit on the analysis flow channel, the detector being configured to detect a sample component separated by the separation unit, wherein
at least a portion of a flow channel on the downstream side of the sample injection unit among a flow channel forming the analysis flow channel is formed of a piping device,
the piping device comprises:
a piping including a diffusion suppression part which has a continuously folded shape, wherein the piping has an inner diameter and an outer diameter, the diffusion suppression part has a plurality of folded parts so as to suppress inner channel diffusion, and the diffusion suppression part has a length; and
a member that is provided along the diffusion suppression part and is directly in contact with the whole of the length of the diffusion suppression part to support the diffusion suppression part to suppress deformation of the folded shape.

19. The analysis apparatus according to claim 18, wherein the separation unit is formed of a separation column and a column oven that houses therein the separation column and adjusts a temperature of the separation column to be a predetermined temperature, a flow channel disposed outside the column oven among the flow channel on the downstream side of the sample injection unit is formed of the piping device, and the piping device comprises a heater that is thermally in contact with the piping to heat the piping.

20. The analysis apparatus according to claim 19 comprising a plurality of the detectors, wherein
the piping device which is comprising a heater that is thermally in contact with the piping to heat the piping is connected to an entrance side of each of the detectors.

* * * * *